United States Patent [19]
Nathan

[11] Patent Number: 6,052,210
[45] Date of Patent: Apr. 18, 2000

[54] SYSTEM AND METHOD FOR INCREASING THE ROBUSTNESS OF AN OPTICAL RING NETWORK

[75] Inventor: Sridhar Nathan, Plano, Tex.

[73] Assignee: MCI Communications Corporation, Washington, D.C.

[21] Appl. No.: 09/006,969

[22] Filed: Jan. 14, 1998

[51] Int. Cl.⁷ .................................................. H04B 10/20
[52] U.S. Cl. .......................................... 359/119; 359/110
[58] Field of Search .................................... 359/110, 119, 359/161; 370/222, 224, 226

[56] References Cited

U.S. PATENT DOCUMENTS

| | | | |
|---|---|---|---|
| 3,652,798 | 3/1972 | McNeilly et al. | 179/15 AL |
| 4,009,469 | 2/1977 | Boudreau et al. | 340/147 SC |
| 4,190,821 | 2/1980 | Woodward | 340/147 SC |
| 5,406,401 | 4/1995 | Kremer | 370/224 |
| 5,442,623 | 8/1995 | Wu | 370/16.1 |
| 5,495,472 | 2/1996 | Ohara | 370/16.1 |
| 5,535,035 | 7/1996 | DeFoster et al. | 359/161 |
| 5,572,534 | 11/1996 | Trubey et al. | 371/20.6 |
| 5,717,796 | 2/1998 | Clendening | 385/24 |
| 5,757,768 | 5/1998 | Goto et al. | 370/222 |
| 5,859,836 | 1/1999 | Eslambolchi | 370/222 |

*Primary Examiner*—Leslie Pascal

[57] ABSTRACT

A system and method for increasing the robustness of an optical ring network having a plurality of ring nodes. Optical data traffic is transmitted between a plurality of ring nodes via optical links. A first optical cross connect switch and a second optical cross connect switch are coupled to an alternate network. The first optical cross connect switch is coupled to a first ring node. The second optical cross connect switch is coupled to a second ring node. When a failure is detected in the first optical link, then the first optical cross connect switch couples the first ring node to an alternate path of the alternate network, and the second optical cross connect switch couples the second ring node to the alternate path, such that optical data traffic is transmitted between the first ring node and the second ring node via the alternate path.

5 Claims, 7 Drawing Sheets

302

| Event (304) | Action (306) |
| --- | --- |
| First-link is not operational (failure detected) | (1) decouple 1-10<br>(2) decouple 2-9<br>(3) couple 1-12<br>(4) couple 2-11 |
| First-link is operative | (1) decouple 1-12<br>(2) decouple 2-11<br>(3) couple 1-10<br>(4) couple 2-9 |

FIG. 3

SYSTEM AND METHOD FOR INCREASING THE ROBUSTNESS OF AN OPTICAL RING NETWORK

BACKGROUND OF THE INVENTION

1. Field of the Invention

The present invention relates generally to optical networks and fiber optic communications.

2. Related Art

Two types of self-healing data transport network topologies are commonly referred to as "ring" and "mesh." In a ring topology each ring node is connected to exactly two other ring nodes. For self-healing, a ring topology network loops back traffic on a spare path to bypass a break in the ring. The ring topology is attractive for its simplicity and switching speed (around 50 ms).

Traffic is maintained on the spare path until the failure is physically repaired. Under most circumstances, only a few hours are needed to find and repair a link. The time to repair a link stretches to several days, however, when the fiber cut location is inaccessible due to natural disaster, train derailment, plane crashes, etc. During the time that repair is ongoing, the ring is vulnerable to any subsequent failure along the ring. This results because the ring's only spare path has been dedicated to restoration of the first failed link.

In contrast to the ring, a properly equipped mesh network does not exhibit this degree of susceptibility to multiple failures. Mesh structures contain nodes that are connected to more than two adjacent nodes. Thus, traffic between two nodes may traverse one or a plurality of possible routes in the network. Mesh architectures require more sophisticated actions to be taken in response to a failure. If there is a sudden failure of several links, switches in neighboring nodes can perform a coordinated switching to divert the traffic around the failure. For this purpose, most of the spans in a mesh network are equipped with extra spare links that can be called upon in response to a failure. Even though a mesh network offers more flexibility in circumventing failures, the mesh restoration is more complex and more time consuming. Typical mesh networks require on the order of a few seconds to a few minutes to restore a link failure.

Thus, in many installations, a ring network is preferred over a mesh network for providing fast recovery of critical traffic among sites. The simplicity of the ring also makes it easier for network and field engineers to readily predict the risks associated with maintenance activities, such as forced switch over to repair or calibrate a network element.

What is needed, therefore, is a system and method for improving the robustness of a ring network in a multiple failure scenario.

SUMMARY OF THE INVENTION

The present invention relates to a system and method that enables a self healing optical ring network to withstand multiple coincident failures by borrowing capacity from a neighboring alternate network, such as a mesh network.

A typical self healing optical ring network can withstand a failure in one link of the network by switching from a normal mode to a failure mode. However, once the failure occurs, the optical ring network can not withstand a subsequent failure until the first failure has been repaired. Repair of a failed link can typically take from a few hours to a few days. The present invention enables a self healing optical ring network to withstand a failure in more than one of its links even if the second failure occurred only a few seconds after the first failure.

The optical ring network of the present invention includes a plurality of ring nodes and a plurality of optical links optically coupled between the plurality of ring nodes for carrying optical data traffic. In the preferred embodiment, a first optical cross connect switch is optically coupled to a first ring node in the optical ring network. A second optical cross connect switch is optically coupled to a second ring node in the optical ring network. The first ring node and the second ring node are connected via a first optical link of the optical ring network. The first and second optical cross connect switches are configured to switch optical data traffic from the first link to an alternate path of an alternate network upon a failure of the first link.

When all of the links are operative, the optical ring network operates in the normal mode. When a link fails, the optical ring network switches to operate in the failure mode until the link is either repaired or appears repaired to the optical ring network. A the link appears repaired to the ring nodes, when an alternate path between the two ring nodes is established.

More specifically, after the optical ring network switches to the failure mode because of a failure in the first link, the first and second optical cross connect switches operate to couple the first ring node and the second ring node to the alternate path. Once the two ring nodes are coupled to the alternate path, the first link appears repaired to the optical ring network, thereby causing the optical ring network to transition back to the normal mode. In the normal mode, optical data traffic is transmitted between the first and second ring nodes via the alternate path. The optical ring network can then withstand a subsequent failure in another link despite the existing failure in the first link.

A feature of the present invention is that an optical ring network can withstand a failure in a second link of the network, prior to the repair of a failure in a first link of the network.

Another feature of the present invention is that an optical ring network can borrow spare capacity from an alternate network to back up links of the optical ring network.

BRIEF DESCRIPTION OF THE FIGURES

The accompanying drawings, which are incorporated herein and form part of the specification, illustrate the present invention and, together with the description, further serve to explain the principles of the invention and to enable a person skilled in the relevant art to make and use the invention.

FIG. 3 is an action table used for controlling switching of optical cross connect switches, according to an embodiment of the present invention.

Figure 1A:
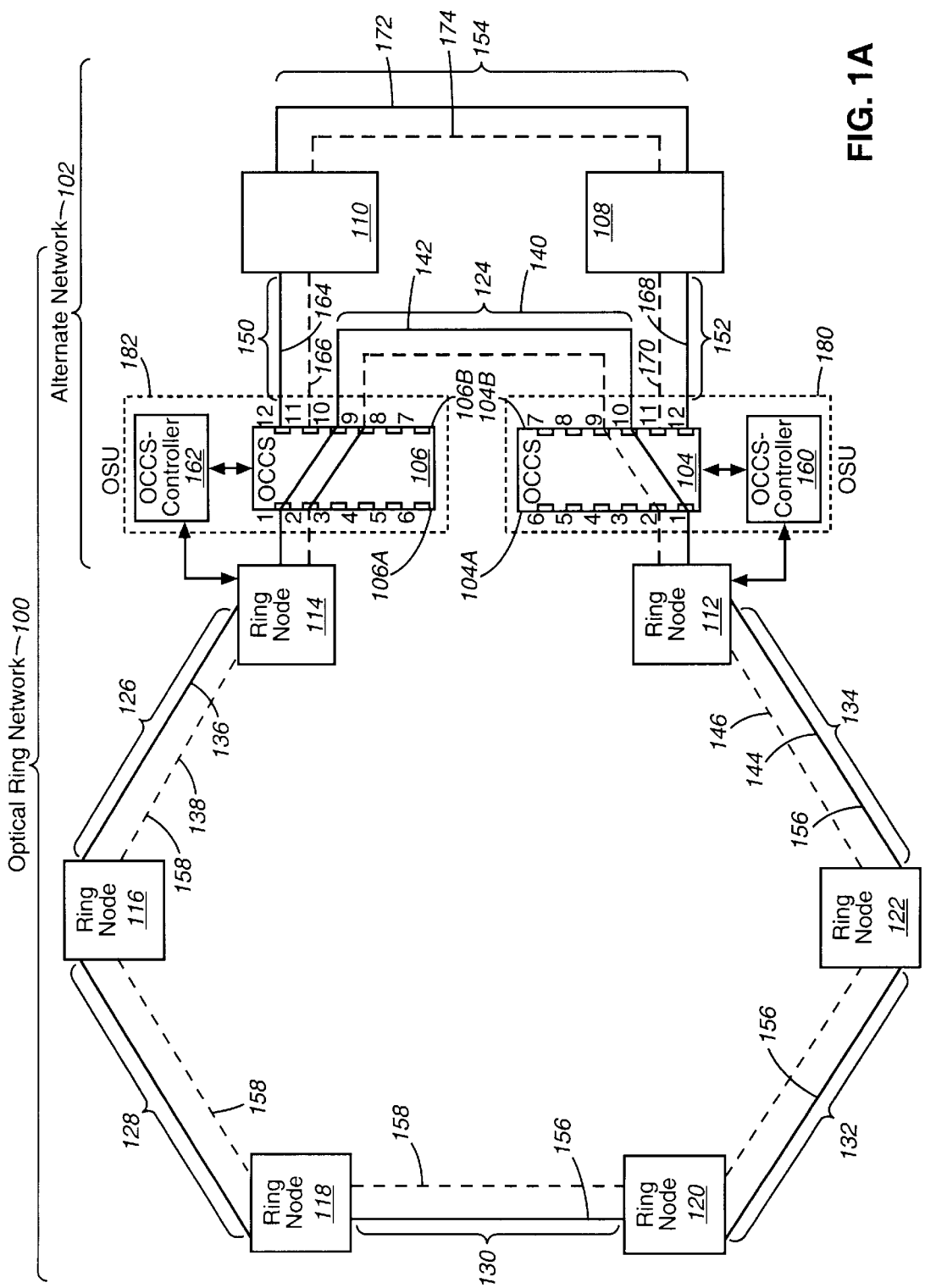
FIGS. 1A and 1B illustrate the operation of a first embodiment of a communications system.

The present invention will now be described with reference to the accompanying drawings. In the drawings, like reference numbers indicate identical or functionally similar elements. Additionally, the left-most digit(s) of a reference number typically identifies the drawings in which the reference number first appears.

DETAILED DESCRIPTION OF THE PREFERRED EMBODIMENTS

Table of Contents

I. Overview
II. Optical Ring Network
  a. Operation of Self-Healing Optical Ring Network
  b. Optical Ring Nodes
  c. Optical Switching Units
III. Alternate Network
IV. Multiple Link Failure Scenarios
  a. First Multiple Link Failure Scenario
  b. Second Multiple Link Failure Scenario
V. Additional Embodiments
VI. Conclusion

I. Overview

The present invention pertains to a system and method that enables a self healing optical ring network to withstand multiple coincident failures by borrowing capacity from a neighboring network. In a ring topology, ring nodes are connected in a series along a closed path forming a circle. Each ring node is connected to two adjacent ring nodes of the ring network via links. Optical data traffic is transmitted between ring nodes via the links. Each link includes a primary fiber and a spare fiber. The collection of primary fibers connecting the ring nodes form a primary path. The collection of spare fibers connecting the ring nodes in the ring form a spare path.

In the present invention, a communications system is provided where optical cross-connect switches (OCCSs) are used to couple ring nodes in an optical ring network with alternate nodes in an alternate network (e.g., mesh network). The OCCSs can be switched to provide a transmission path between two ring nodes via either an optical link of the optical ring network or an alternate path of the alternate network. When required (e.g. if the optical link fails), the OCCSs configure to reroute traffic transmitted between the two ring nodes via an alternate path of the alternate network.

FIGS. 1A, 1B, 2A, and 2B are diagrams of a communications system according to the present invention. Optical ring network 100 includes ring nodes 112–122 and optical links 124–134. Alternate network 102 includes OCCSs 104–110 and alternate links 150–154. Optical ring network 200 includes ring nodes 212–222 and optical links 224–234. Alternate network 202 includes OCCSs 204–210 and alternate links 250–254. Elements of the optical ring networks and alternate networks are discussed in further detail below.

II. Optical Ring Network

FIG. 1A is a block diagram of a first embodiment of the communications system of the present invention. Optical data traffic is transmitted between ring nodes 112, 114, 116, 118, 120 and 122 via links 124, 126, 128, 130, 132 and 134 of optical ring network 100. In a preferred embodiment, ring nodes 112-122 are add/drop multiplexers (ADMs). Each link includes a primary fiber and a spare fiber. For example, link 126 includes primary fiber 136 and spare fiber 138. The ring nodes are discussed in further detail below. Ring node 112 is coupled to OCCS 104. Ring node 114 is coupled to OCCS 106. OCCS 104 and OCCS 106 are coupled to link 124. OCCS 104 is also coupled to alternate-link 152 of alternate network 102. OCCS 106 is also coupled to alternate-link 150 of alternate network 102. Alternate-link 152, alternate link 154, and alternate-link 150 form an alternate path that can carry data traffic through alternate network 102.

The collection of primary fibers in links 124-134 form primary path 156 of optical ring network 100. The collection of spare fibers in links 124–134 form spare path 158 of optical ring network 100. When all of the links 124–134 are operative (e.g, no fiber cuts): OCCS 104 couples ring node 112 to link 124 and OCCS 106 couples ring node 114 to link 124. Generally, when all of the links are operative, optical data traffic is transmitted around optical ring network 100 via primary fibers of primary path 156.

During a normal mode of operation, all optical data traffic is transmitted in one direction (clockwise or counterclockwise) via primary fibers of primary path 156 of optical ring network 100. Spare fibers of spare path 158, used during the ring's failure mode, carry optical data traffic in the reverse or opposite direction as compared to primary path 156. For self-healing, optical ring network 100 loops back optical data traffic in a reverse-direction along spare fibers of spare path 158 to bypass a failure in optical ring network 100. Below is a discussion of how optical ring network 100 operates during failure mode to withstand a failure in a single one of its links by using the spare fibers of spare path 158.

a. Operation of Self-Healing Optical Ring Network

Assume that during normal mode, optical data is transmitted in a clockwise direction on primary fibers of primary path 156 of optical ring network 100. Optical data traffic transmitted from ring node 116 to ring node 122 travels on primary fibers 136, 142 and 144 of respective fiber links 126, 124, and 134. Thus, the optical data traffic is transmitted: from ring node 116 to ring node 114, from ring node 114 to ring node 112, and finally from ring node 112 to ring node 122.

Additionally, assume that a failure occurred at link 124. Such a failure may be caused by a fiber cut. During a failure of a link, the failed link shall be considered inoperative. When this failure occurs, nodes 112 and 114, which are adjacent to failed link 124, recognize the failure and operate to transfer optical data traffic in the reverse direction (counterclockwise) along fibers of spare path 158. Data originating from node 116 and destined for node 122 now travels via the following route: from node 116 to node 114 via the primary fiber 136 of link 126; from node 114 back to node 116 via the spare fiber 138 of link 126; the data continues to travel counterclockwise via spare fibers of spare path 158 from node 116 to node 118, from node 118 to node 120, and finally from node 120 to node 122. Optical ring network 100 now operates in failure mode, as opposed to normal mode.

A self-healing optical ring network is attractive for its simplicity and fast switching speed (around 50 ms). However, during the time period that the first failure is being physically repaired, the optical ring network is vulnerable to subsequent failures.

b. Optical Ring Nodes

As stated above, the ring nodes of optical ring network 100 are preferably ADMs. Besides passing optical data from one link to another, the ring nodes also provide a point of access and egress for signals into and out of the network. The ring nodes can also switch optical data traffic from a primary fiber to a reverse-direction spare fiber when a failure in a link occurs. Each ring node has ports to support connectivity to two adjacent spans, wherein each span includes a primary fiber and a spare fiber. When the links of the optical ring network are operative, optical data traffic enters and exits the ring node on the primary fibers. When one of the links fails (and optical ring network changes from normal mode to failure mode), the ring nodes adjacent to the failed link switch traffic back in the reverse direction on the spare fiber as described above.

c. Optical Switching Units

Figure 1B:
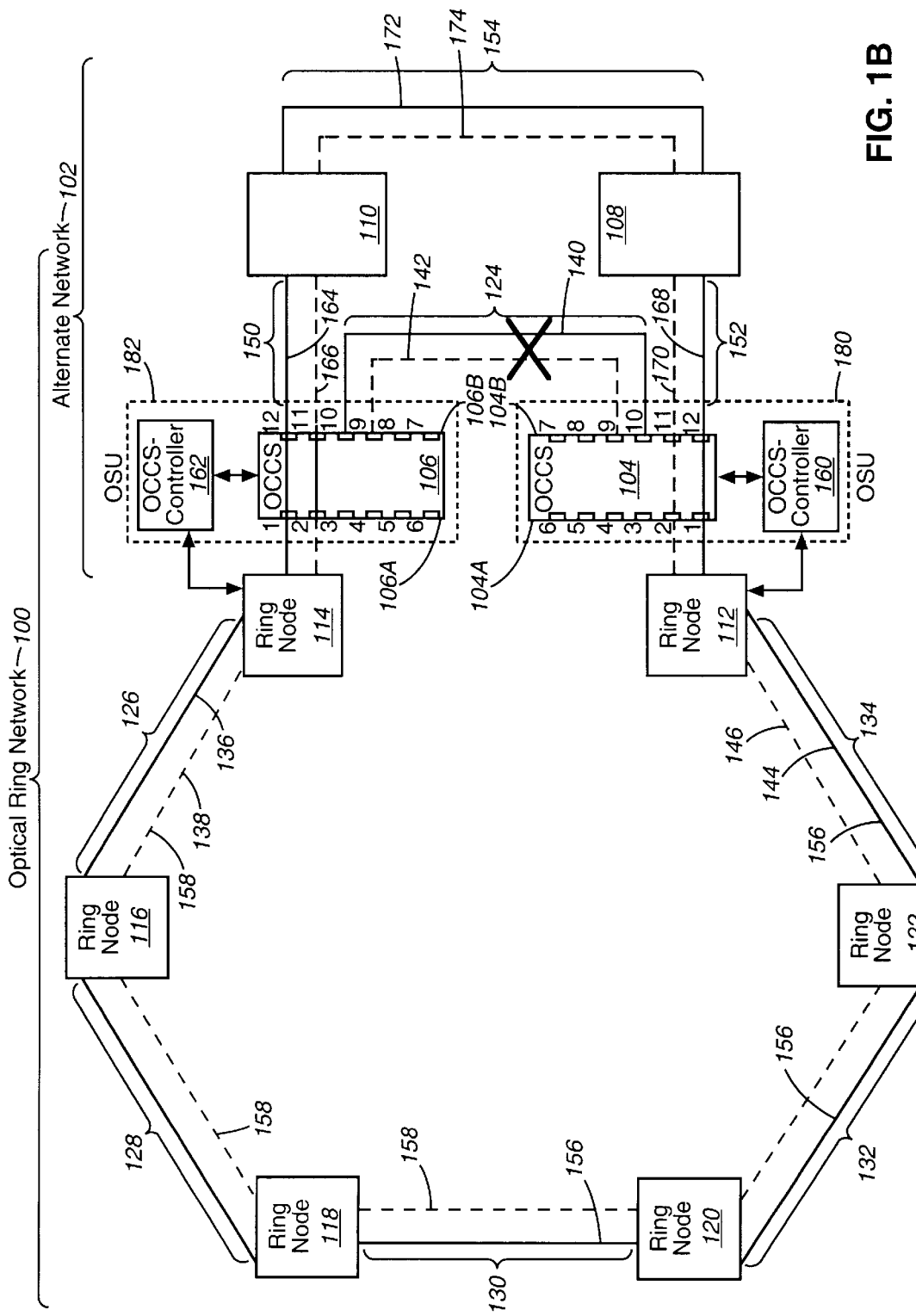

FIGS. 1A and 1B show optical switching units (OSUs) 180 and 182. OSU 182 includes OCCS 106 and OCCS-controller 162. OSU 180 includes OCCS 104 and OCCS-controller 160. In one embodiment, OCCS 106 and OCCS-controller 162 form one integral unit. In another embodiment, OCCS 106 and OCCS-controller 162 are two separate units coupled together such that OCCS-controller 162 can transmit and receive data from OCCS 106. If OCCS-controller 160 is a separate unit from OCCS 106, they may communicate with one another via optical ring network 100 or alternate network 102. The same is true for OCCS 104 and OCCS-controller 160. In a further embodiment, a single OCCS-controller controls multiple OCCSs.

An OCCS is a device that can switch optical paths between a plurality of optical ports. In one embodiment, any one of a plurality of optical ports on one face of the OCCS can be internally optically coupled to any port on a second face of the OCCS. For example, in FIG 1A, OCCS 106 is configured so that optical signals passing through the OCCS pass from: port 1 of side 106A to port 10 of side 106B; and from port 2 of side 106A to port 9 of side 106B. Generally, any one of the plurality of optical ports can be internally optically coupled to any other port within the OCCS.

The operation of the OCCSs is transparent to the ring nodes. In other words, ring nodes are not aware of the presence of OCCSs, they simply respond to the signal conditions they see.

OCCS-controllers 160, 162 control the switching of OCCSs 104, 106, respectively. For example, OCCS-controllers 160, 162 send and receive status and switch commands to and from OCCSs 104, 106, respectively. Examples of switch commands include port coupling and decoupling commands. A port coupling command causes an OCCS to internally couple a first port of the OCCS to a second port of the OCCS.

Besides respectively monitoring ring nodes 104 and 106, OCCS-controllers 160 and 162 can also monitor the other ring nodes of optical ring network 100. Additionally, OCCS-controllers 160, 162 can communicate with an alternate network management system (not shown) of alternate network 102. With information from these sources, OCCS-controllers 160, 162 can control the switching of OCCSs 104, 106.

Consider OCCS 106, face 106A of OCCS 106 includes ports 1–6, of which ports 1 and 2 are optically coupled to ring node 114. An opposite OCCS face 106B has ports 7–12, of which: ports 10 and 9, respectively, are optically coupled to primary fiber 140 and spare fiber 142 both of link 124; and ports 12 and 11 respectively, are optically coupled to primary line 164 and spare line 166 both of alternate link 150. Depending on whether alternate link 150 is an optical link or an electrical link, additional equipment such as a linear terminal may be required. Optical signals received at any of ports 1–6 of face 106A can be switched to exit any of ports 7–12 of face 106B.

Specific software and/or hardware implementations for addressing, monitoring, and controlling OCCS 106 through OCCS-controller 162 based on the number of ports and switch configurations would be apparent to one skilled in the relevant art. OCCSs are not restricted to twelve ports.

III. Alternate Network

Alternate network 102 refers to a network which provides an alternate path for transmission of optical data traffic between two ring nodes of optical ring network 100. Alternate network 102 may have any topology including but not limited to mesh, ring, and point-to-point. In the preferred embodiment, alternate network 102 is a mesh network, wherein each alternate network node includes an OCCS. Alternate network nodes of alternate network 102 include OCCS 104, OCCS 106, OCCS 110, and OCCS 108. Alternate network 102 can include an arbitrary number of nodes. OCCS 104 and OCCS 106 are essential to the present invention. However, the alternate network nodes of alternate network 102, which do not include either OCCS 104 or OCCS 106, do not need to include an OCCS. Thus, OCCS 108 and OCCS 110 are not essential to the present invention.

OCCS 104 and OCCS 106, are coupled to optical ring network 100. OCCS 104 and OCCS 106 enable optical data traffic between ring node 112 and ring node 114 to be transmitted via link 124, or via alternate links 150, 154, and 152 in alternate network 102.

The alternate path through alternate network 102 need not be a dedicated backup to optical ring network 100. Preferably, the alternate path is reserved on an as needed basis and comprises an arbitrary number of spans in alternate network 102.

Alternate network 102 is monitored and controlled by an Alternate Network Management System (alternate-NMS) (not shown). OCCS-controller 160 and OCCS-controller 162 respectively control the switching of OCCS 104 and OCCS 106. In the preferred embodiment, the OCCS-controllers communicate with the alternate-NMS to send status signals indicating when an alternate path through alternate network 102 is required.

IV. Multiple Link Failure Scenarios

Figure 4A:
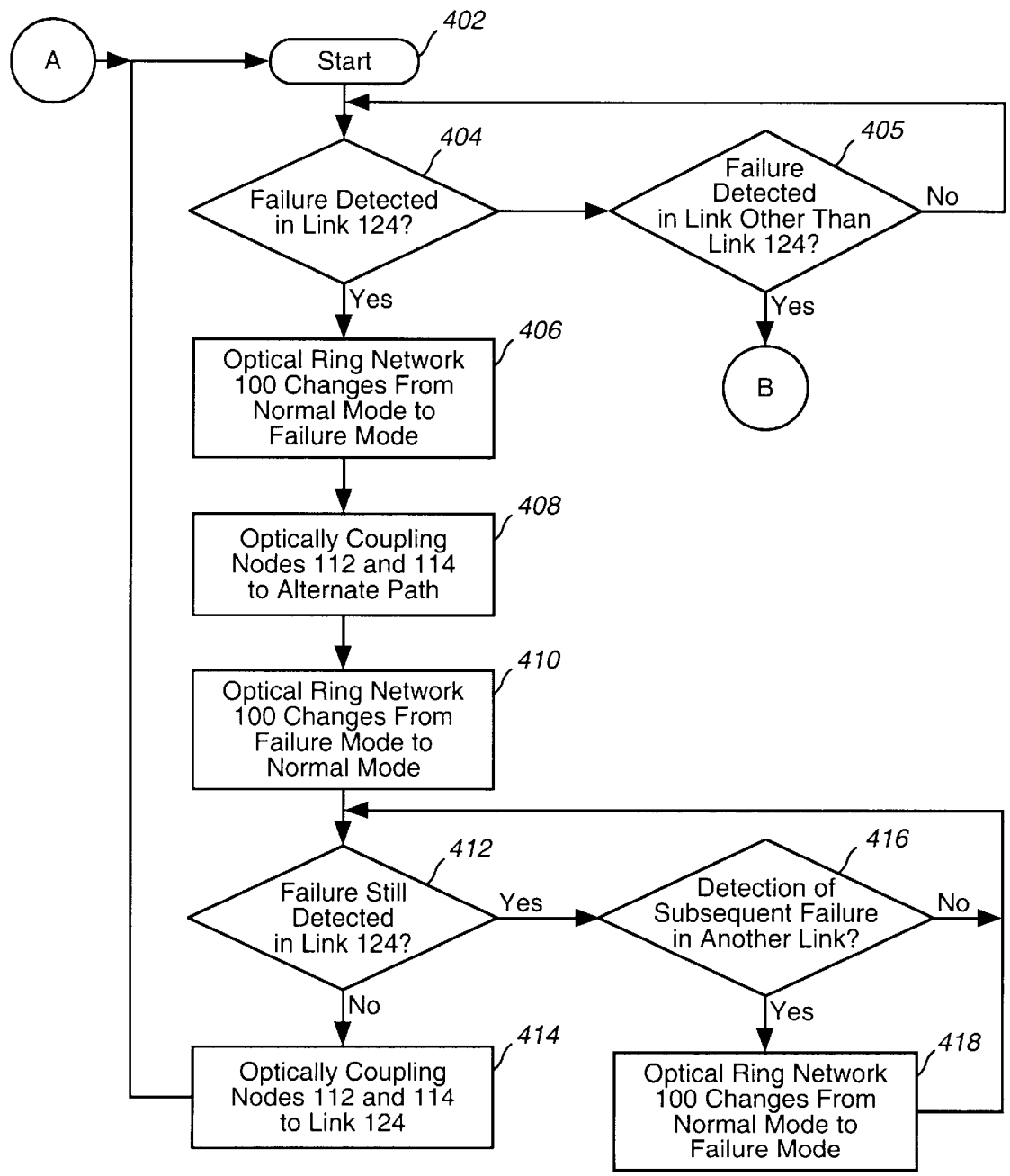
FIG. 4A is a control flow diagram representing the operation of the communications system, during a first failure scenario.
Figure 4B:
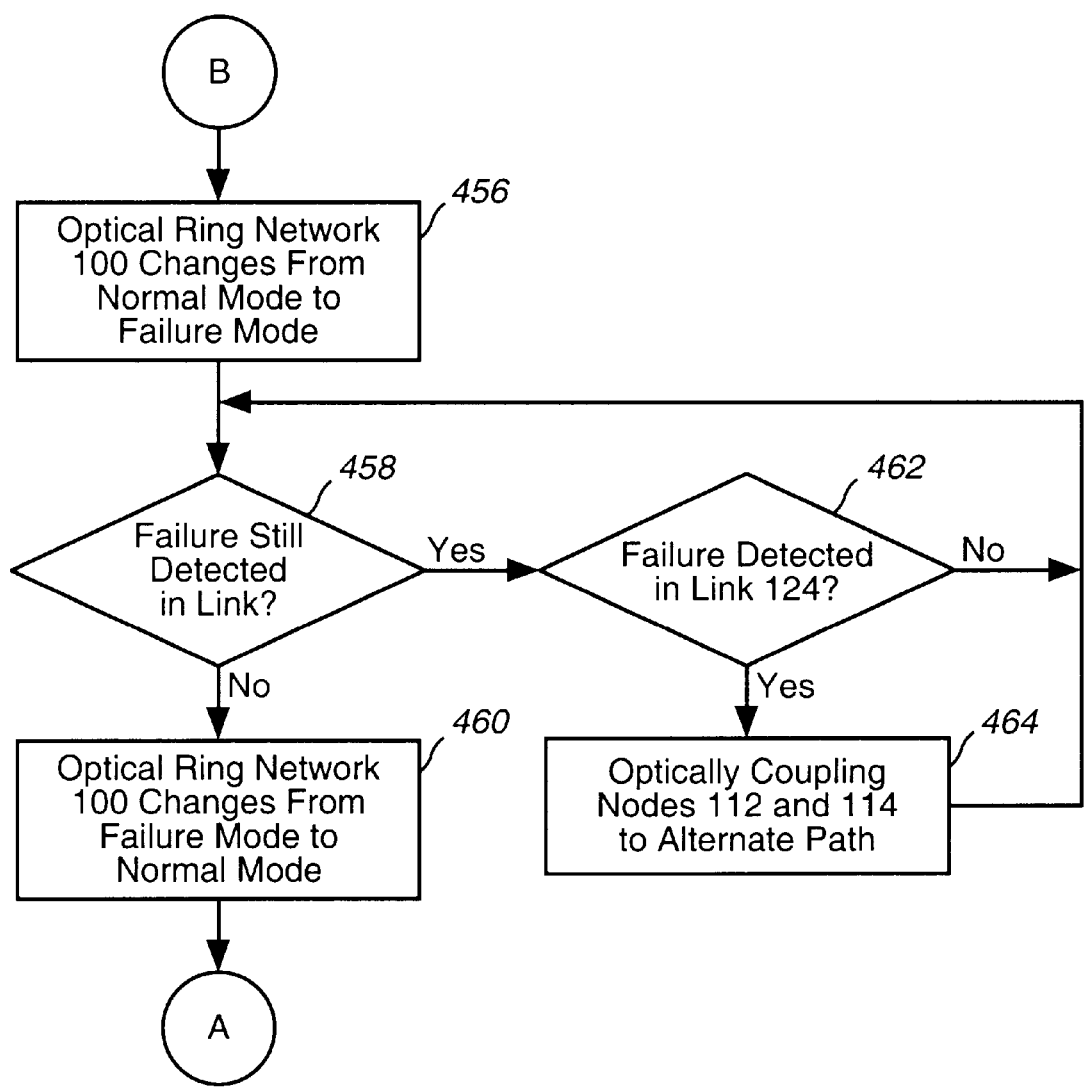
FIG. 4B is a control flow diagram representing the operation of the communications system, during a second failure scenario.

FIGS. 4A and 4B are flow charts showing the operation of the communications system of the present invention. In these flowcharts, the following conventions are employed: a rounded box indicates a step in which a process starts or stops, a diamond-shaped box indicates a decision step that results in a branch, and a rectangular box indicates a step in which some action transpires. FIG. 4A describes the operation of a First Multiple Link Failure Scenario. FIG. 4B describes the operation of a Second Multiple Link Failure Scenarios. Because operation of the present invention is similar for the embodiments shown in FIGS. 1A and 1B and FIGS. 2A and 2B, FIGS. 4A and 4B will be described in relation to only FIGS. 1A and 1B.

The purpose of FIGS. 4A and 4B is to demonstrate that the present invention enables an optical ring network to withstand two coinciding failed links, whether or not the first link that failed is the link for which an alternate path is provided.

a. First Multiple Link Failure Scenario

In FIG. 4A, control begins at step 402 and immediately continues to step 404. In step 404, if no failure is detected in link 124 then flow continues to step 405. If a failure is detected in link 124, optical network 100 transitions from normal mode to failure mode in step 406. Referring to FIG. 1, ring node 112 and ring node 114 reroute optical data traffic between the two ring nodes along spare fibers of spare path 158 (more specifically the spare fibers of links 126, 128, 130, 132 and 134). Once in failure mode, optical ring network 100 is susceptible to a subsequent failure which would cause at least one ring node of optical ring network 100 to be isolated from the other ring nodes.

To ensure that optical ring network 100 can withstand a subsequent failure, the present invention borrows capacity from alternate network 102. In step 408, OCCSs 104, 106 couple ring nodes 112, 114 of the optical ring network 100 to an alternate path of alternate network 102. In the preferred embodiment, OCCS-controller 162 monitors ring node 114 and communicates with the alternate-NMS. By monitoring ring node 114, OCCS-controller 162 can detect a failure in link 124. Upon receiving a link failure indication, OCCS-controller 162 consults an action table. FIG. 3 illustrates an example of such an action table. Action table 302 includes two columns, event column 304 and action column 306. This table structure allows OCCS-controller 162 to automatically determine a response to an event. For example, when OCCS-controller 162 receives an indication of a failure in link 124, then the corresponding event and associated action is identified. In this case, OCCS-controller 162 directs OCCS 106 to: (1) decouple port 1 from port 10; (2) decouple port 2 from port 9; (3) couple port 1 to port 12; and (4) couple port 2 to port 11. OCCS-controller 162 will issue appropriate switch commands to OCCS 106 provided that such commands are necessary. Commands won't be necessary if the current configuration of OCCS 106 already corresponds to the actions in action table 302.

OCCS-controller 160 follows the same procedure described above. The end result is an alternate path (including alternate links 150, 154, and 152) through alternate network 102, which provides a working path between ring node 112 and ring node 114. FIG. 1B shows the connections of OCCS 104 and OCCS 106 upon a failure of link 124. Ring node 112 is now coupled through OCCS 104 to alternate link 152; and ring node 114 is now coupled through OCCS 106 to alternate link 150. This process is represented by step 408. Alternate links 152, 150, and 154 form the alternate path through alternate network 102. The alternate path is not limited to three links of alternate network 102.

Continuing to step 410, once the alternate path is established, the failed link appears operative to ring nodes 112 and 114. Ring node 112 and ring node 114 then transition from the failure mode to the normal mode. Optical data traffic that had normally traveled via primary fiber 140 of link 124, now travels via primary lines 164, 172, and 168 of alternate links 150, 154, and 152, respectively. Optical ring network 100 is now capable of withstanding a subsequent failure because the self-healing operation of optical ring network 100 can now function using spare lines 166, 170, and 174, of alternate links 150, 154, and 152 respectively.

Next in step 412, a determination is made as to whether link 124 has been repaired. If failed link 124 is repaired, then in step 414 OCCS-controllers 160 and 162 return traffic from alternate links 150, 154, and 152 to link 124. Upon receiving an indication that link 124 is operative (i.e., repaired), OCCS-controllers 160, 162 consult action table 302 and perform the action associated with the event "first link is operative." In this case, the corresponding action is for the OCCS-controllers 160 and 162 to direct respective OCCSs 104 and 106 to: (1) decouple port 1 from port 12; (2) decouple port 2 from port 11; (3) couple port 1 to port 10; and (4) couple port 2 to port 9. Thus in step 414, nodes 112 and 114 are coupled back to link 124.

When link 124 is repaired, optical data traffic should be switched from the alternate path to link 124 without a disturbance in performance. In one embodiment, false failure signals are sent to ring nodes 112 and 114 indicating a failure in the path between the two nodes. Upon receiving the false failure signals, optical ring network 100 will transition to failure mode with ring nodes 112 and 114 switching traffic to spare fibers of spare path 158. During the failure mode, OCCSs 104, 106 decouple ring nodes 112, 114 from the alternate path and couple ring nodes 112, 114 to link 124. Upon removal of the false failure signals, optical ring network 100 changes back to normal mode and traffic between ring nodes 112 and 114 travels via repaired link 124. Thus, by using the false failure signals, traffic can transition from the alternate path to repaired link 124 without a significant disruption.

If in step 412, link 124 is not yet repaired, then a determination is made in step 416 of whether a subsequent failure is detected in another link of optical ring network 100 or in a link of the alternate path through alternate network 102. If a subsequent failure is detected, optical ring network 100 changes from normal mode to failure mode in step 418. At this instance, optical ring network 100 has withstood two link failures. For example, if optical link 130 fails: optical ring network 100 changes to failure mode; and adjacent ring nodes 118 and 120 operate to transmit optical data traffic on reverse-direction spare fibers of spare path 158 and spare lines 166, 174, and 170 of the alternate path. Alternatively, if a failure occurs in any link 150, 152, or 154 of the alternate path: optical ring network 100 changes to failure mode; and ring nodes 112 and 114 operate to transmit optical data traffic on reverse-direction spare fibers of spare path 158. Note that ring nodes 112 and 114 need not be adjacent to the failure to effect the loopback. Ring nodes 112 and 114 will effect a loopback if any one of the links in the alternate path fails.

Additional steps can be added to the operation of the present invention such as to change optical ring network 100 from failure mode to normal mode if the subsequent failure in a second link is repaired prior to the repair of link 124.

b. Second Multiple Link Failure Scenario

The present invention also operates to withstand concurrent failures of two links, even where the link that first failed does not have an associated alternate path. For example, assume link 130 fails and ring nodes 118 and 120 are not connected into an alternate network through OCCSs. Optical ring network 100 will enter failure mode and place optical data traffic on the spare fibers of spare path 158 to bypass the failure. If the second failure occurs at link 124, link 124 can be restored through an alternate path of alternate network 102 as discussed above. Thus, optical ring network 100 can withstand two failures, even if the first failure occurs on a link that is not backed up by an alternate network. This multiple link failure scenario is illustrated in FIGS. 4A and 4B.

First in step 405 of FIG. 1A a determination is made as to whether a failure has occurred in a link other then link 124. If a failure is detected in a link other than link 124, then the process flow jumps to step 456 of FIG. 4B. FIG. 4B describes the operation of the Second Multiple Link Failure Scenario. Following detection of a failure in a link other than link 124, optical ring network 100 changes from normal mode to failure mode in step 456. In the above example, if link 130 fails and ring nodes 118 and 120 are not connected to an alternate network, ring nodes 118 and 120 will switch traffic onto the spare fibers of spare path 158.

Continuing to step 458, if the link of step 454 has been repaired, then in step 460 optical ring network 100 changes from failure mode to normal mode. In step 458, if the failed link that prompted the change to failure mode in step 456 has not yet been repaired, then the flow proceeds to step 462 to determine if a subsequent failure has been detected in link 124. If a subsequent failure has been detected in link 124, then the flow proceeds to step 464. In step 464: OCCS-controller 160 directs OCCS 104 to decouple ring node 112 from link 124 and to couple ring node 112 to the alternate path; and OCCS-controller 162 directs OCCS 106 to decouple ring node 114 from link 124 and to couple ring node 114 to the alternate path. Thus, in step 464, nodes 112 and 114 are coupled to the alternate path. At this instance optical ring network 100 has withstood two coinciding failures.

V. Additional Embodiments

The operation of OCCS-controllers 160, 162 can be changed by modifying the action table shown in FIG. 3. In one embodiment, if a failure occurs in link 124, OCCS-controllers 160, 162 can be programmed to wait until a second failure is detected in one of the other links 126–134, before communicating with the alternate-NMS to establish an alternate path. In another embodiment, once a failure occurs in link 124, the OCCS-controllers can be programmed to communicate with the alternate-NMS to reserve the spare path, so that if a subsequent failure occurs in one of the other links 126–134, the OCCS-controllers can immediately switch optical data traffic, between ring node 112 and ring node 114, to the alternate path. Additional responses to other multiple link failure scenarios are possible and may be added to the action tables. The decision whether to use an alternate path and/or which alternate path to use can be performed manually or automatically.

Figure 2A:
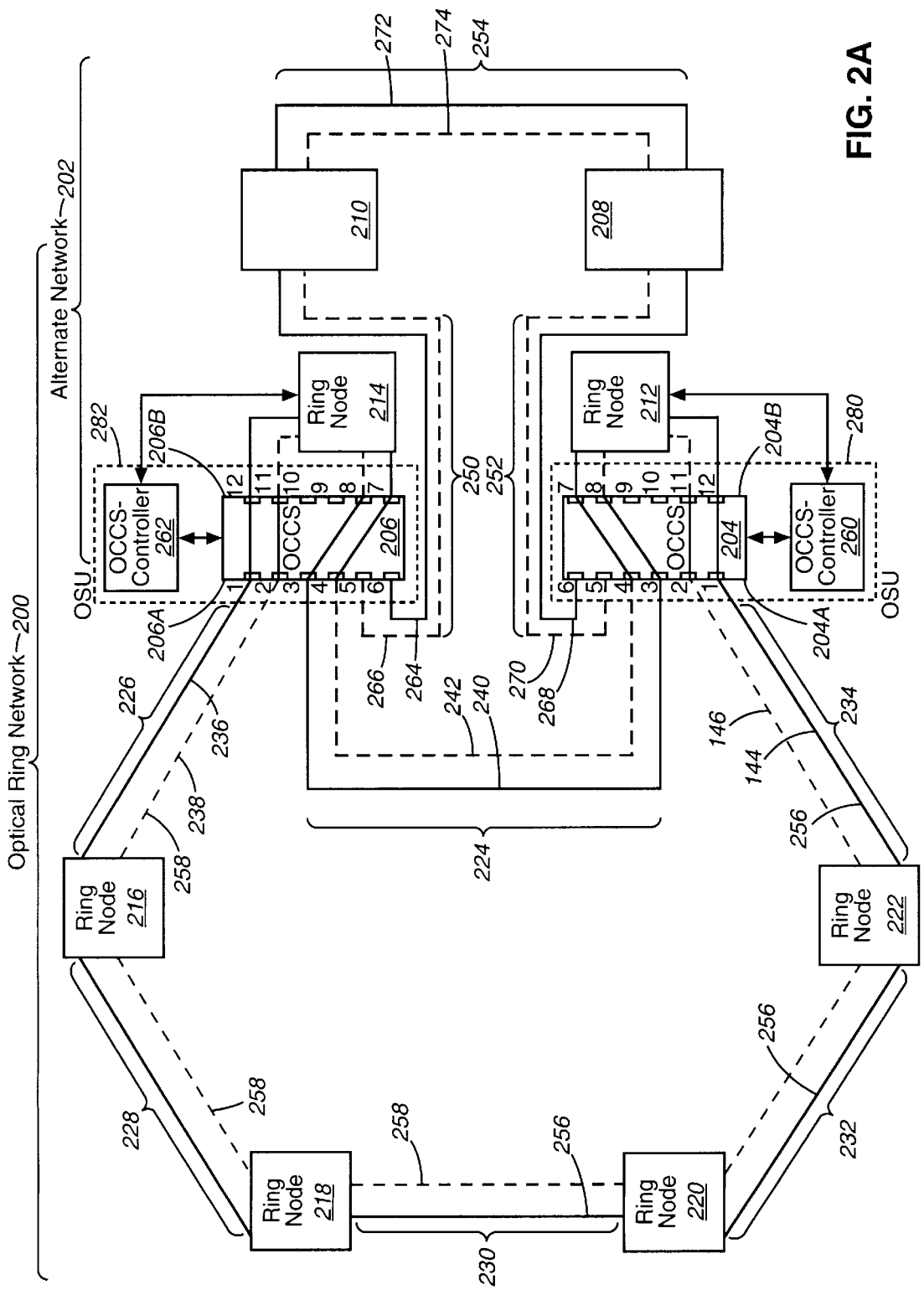
FIGS. 2A and 2B illustrate the operation of a second embodiment of a communications system.
Figure 2B:
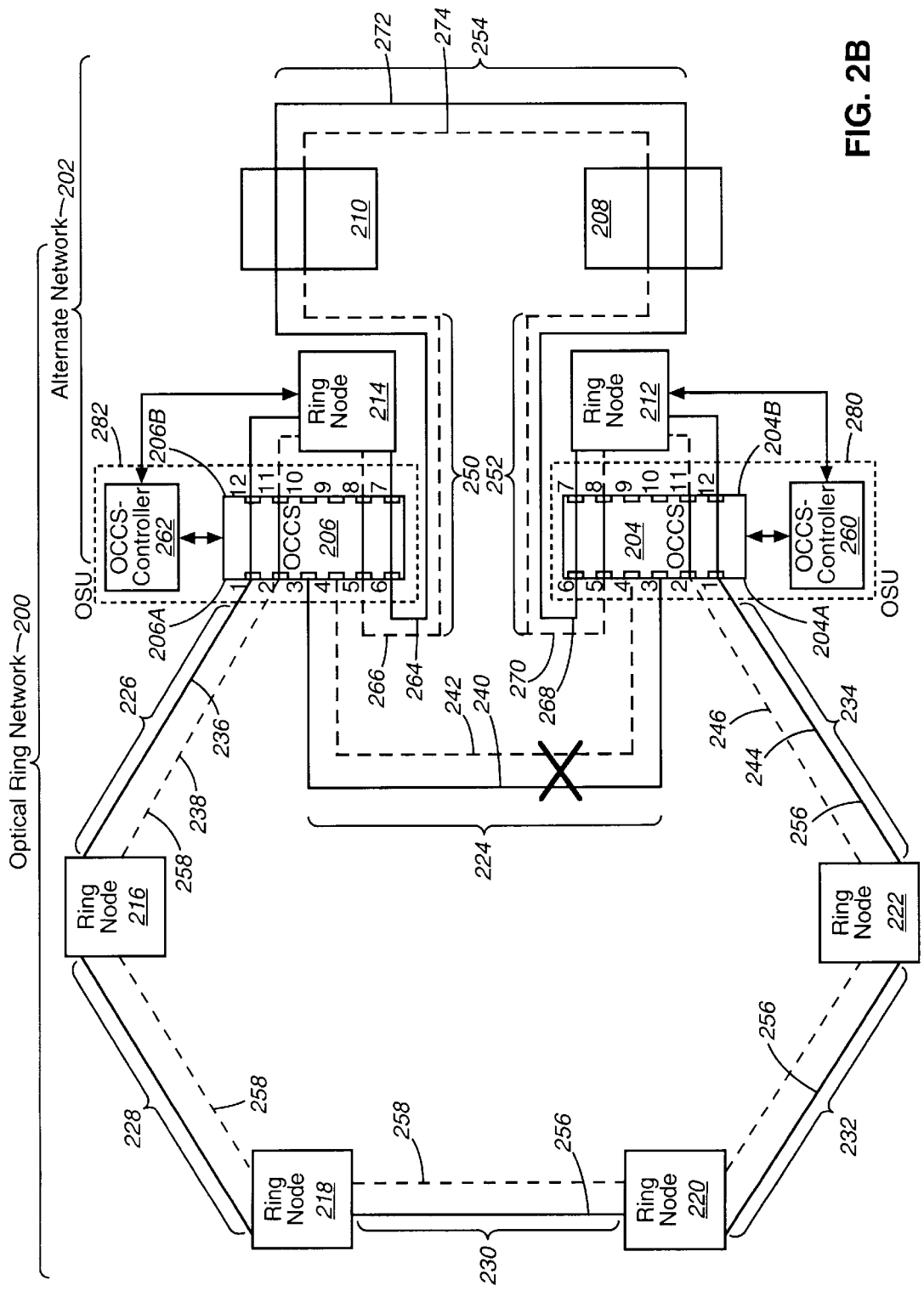

FIGS. 2A and 2B show an alternative embodiment of the present invention. In FIG. 2A optical data traffic is transmitted between ring node 212 and ring node 214 via link 224. FIG. 2B shows the connections of OCCS 204 and OCCS 206 during a failure of link 224. As in FIGS. 1A and 1B, FIGS. 2A and 2B show the OCCSs' operation to establish an alternate path through an alternate network 202 to bypass a failed link of the optical ring network 200. Note that in FIGS. 2A and 2B: both link 226 and 224 are connected through OCCS 206; and both link 224 and 234 are connected through OCCS 204. In this embodiment, OCCSs 204 and 206 can operate in concert with the additional OCCSs (not shown) associated with nodes 226 and 222 to provide an alternate path for links 226 and 234. The robustness of the optical ring network 200 can be further increased with the provision of additional OCCSs throughout optical ring network 200. Thus, by adding additional OCCSs to other ring nodes of optical ring network 200, optical ring network 200 could withstand more than two coinciding link failures.

VI. Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. In an environment having an optical ring network including a plurality of ring nodes and a plurality of optical links optically coupled between the plurality of ring nodes for carrying optical data traffic, a first optical cross connect switch optically coupled to a first ring node in the optical ring network, a second optical cross connect switch optically coupled to a second ring node in the optical ring network, the first ring node and the second ring node connected via at least one optical link, a restoration method comprising the steps of:

(1) detecting a failure in the at least one optical link;

(2) switching the optical ring network from a normal mode to a failure mode to bypass said failure in the at least one optical link;

(3) switching the first and second optical cross connect switches to optically couple the first and second ring nodes to an alternate network, wherein transmission between the first ring node and the second ring node is via an alternate path of said alternate network; and (4) switching the optical ring network from said failure mode to a normal mode, wherein said normal mode includes transmission via said alternate path of said alternate network.

2. The method of claim 1, further comprising the step of:

(5) switching the first and second optical cross connect switches to optically couple the first and second ring nodes to the at least one optical link of the optical ring network when said failure of the at least one optical link is repaired, wherein transmission between the first ring node and the second ring node is via the at least one optical link.

3. The method of claim 2, wherein said step (5) further comprises the steps of:

(a) sending a false failure signal simulating a failure in said alternate path when said failure of the at least one optical link is repaired;

(b) switching the optical ring network from said normal mode to said failure mode;

(c) switching the first and second optical cross connect switches to optically couple the first and second ring nodes to the at least one optical link; and (d) switching the optical ring network from said failure mode to said normal mode, wherein data transmitted between the first ring node and the second ring node is via the at least one link.

4. The method of claim 1, further comprising the step of:

(5) switching the optical ring network from said normal mode the said failure mode, upon a subsequent failure of an additional optical link of the optical ring network while the at least one optical link is inoperative, wherein said failure mode includes transmission of traffic over said alternate path of said alternate network.

5. In an environment having an optical ring network including a plurality of ring nodes and a plurality of optical links optically coupled between the plurality of ring nodes for carrying optical data traffic, a first optical cross connect switch optically coupled to a first ring node in the optical ring network, a second optical cross connect switch optically coupled to a second ring node in the optical ring network, the first ring node and the second ring node connected via a first optical link of the plurality of optical links, a restoration method comprising steps of:

detecting a failure in a second optical link of the plurality of optical links;

switching the optical ring network from a normal mode to a failure mode to bypass said failure in said second optical link;

switching the first and second optical cross connect switches to optically couple the first and second ring nodes to an alternate network when a subsequent failure is detected in the first optical link prior to repair of said second optical link, wherein transmission between the first ring node and the second ring node is via an alternate path of said alternate network;

switching the optical ring to normal mode when said second optical link is repaired, wherein transmission between the first ring node and the second ring node is via said alternate path;

switching the first and second optical cross connect switches to optically couple the first and second ring nodes to the first link when the first link is repaired, wherein the transmission between the first ring node and the second ring node is via the first optical link;

sending a false failure signal simulating a failure in said alternate path when said failure of the first optical link is repaired;

switching the optical ring network from said normal mode to said failure mode;

switching the first and second optical cross connect switches to optically couple the first and second ring nodes to the first optical link; and switching the optical ring network from said failure mode to said normal mode, wherein data transmitted between the first ring node and the second ring node is via the first optical link.

* * * * *